(12) United States Patent
Deshpande

(10) Patent No.: US 9,055,410 B2
(45) Date of Patent: Jun. 9, 2015

(54) METHOD FOR COLLECTIVELY TRANSFERRING LOGICALLY GROUPED OBJECTS

(71) Applicant: Samsung Electronics Co., Ltd., Gyeonggi-do (KR)

(72) Inventor: Nishant Bhaskar Deshpande, Bangalore (IN)

(73) Assignee: Samsung Electronics Co., Ltd (KR)

( * ) Notice: Subject to any disclaimer, the term of this patent is extended or adjusted under 35 U.S.C. 154(b) by 52 days.

(21) Appl. No.: 13/762,654

(22) Filed: Feb. 8, 2013

(65) Prior Publication Data

US 2013/0210396 A1     Aug. 15, 2013

(30) Foreign Application Priority Data

Feb. 10, 2012   (IN) .............................. 512/CHE/2011

(51) Int. Cl.
*H04M 3/42* (2006.01)
*H04W 4/06* (2009.01)
*H04W 4/08* (2009.01)

(52) U.S. Cl.
CPC . *H04W 4/06* (2013.01); *H04W 4/08* (2013.01)

(58) Field of Classification Search
CPC .............................. H04L 51/12; H04L 12/585
USPC ........... 455/411, 414.1, 421, 466, 423, 422.1, 455/444; 705/14.66, 14.64; 709/202, 224, 709/206; 370/352, 254, 245
See application file for complete search history.

(56) References Cited

U.S. PATENT DOCUMENTS

2005/0086384 A1*   4/2005   Ernst .............................. 709/248
2011/0010340 A1*   1/2011   Hung et al. .................... 707/623
2012/0166623 A1*   6/2012   Suit ............................... 709/224

FOREIGN PATENT DOCUMENTS

KR   1019940015807   7/1994
KR   1020020042910   6/2002

* cited by examiner

*Primary Examiner* — Kiet Doan
(74) *Attorney, Agent, or Firm* — The Farrell Law Firm, P.C.

(57) ABSTRACT

A method for creating, utilizing/applying and transferring a group of objects from a communication device to a remote device in a network is provided. The method includes creating at least one group of related objects by extracting the related objects from a database of the communication device; applying rules and properties to the created group locally on the communication device; connecting to the remote device for transferring the group; and transferring the group to the remote device as a single entity.

15 Claims, 16 Drawing Sheets

Group displayed with icon 1201

BEGIN:VCARD
VERSION:2.1
REV:20120517T103707Z
END:VCARD
BEGIN:VCARD

> VERSION:2.1
> N;CHARSET=SHIFT_JIS:Shambhu;A
> SOUND;X-IRMC-N;CHARSET=SHIFT_JIS:Shambu MT;A
> TEL;CELL:+919945173331
> EMAIL;CELL:shambhu.t@samsung.com
> URL;HOME:www.samsung.com
> ORG;CHARSET=SHIFT_JIS:SISO
> TITLE;CHARSET=SHIFT_JIS:Lead Engineer
> NOTE;CHARSET=SHIFT_JIS;ENCODING=
> QUOTEDPRINTABLE:Meeting today!
> X-S-BLOOD:A
> BDAY:19791002
> ADR;WORK;CHARSET=SHIFT_JIS;ENCODING=QUOTE
> D-PRINTABLE:;;;;;INDIA
> ADR;HOME;CHARSET=SHIFT_JIS;ENCODING=QUOTE
> D-PRINTABLE:;;;BANGALORE;;;INDIA
> REV:20120617T105650Z
> X-CLASS:PUBLIC
> X-GNO:1
> X-GN;CHARSET=SHIFT_JIS;ENCODING=
> QUOTEDPRINTABLE:LCteam

END:VCARD
BEGIN:VCARD

> VERSION:2.1
> N;CHARSET=SHIFT_JIS:Sajith;B
> SOUND;X-IRMC-N;CHARSET=SHIFT_JIS:Sajith U;B
> TEL;CELL;WORK:+919980741602
> EMAIL;HOME:sajithU@yahoo.com
> URL;HOME:www.samsung.com
> ORG;CHARSET=SHIFT_JIS:SISO
> TITLE;CHARSET=SHIFT_JIS:Design Engineer
> NOTE;CHARSET=SHIFT_JIS;ENCODING=
> QUOTEDPRINTABLE:Sleep on Sunday
> BDAY:20120202
> ADR;WORK;CHARSET=SHIFT_JIS;ENCODING=
> QUOTEDPRINTABLE:;;;;BLORE;;;INDIA
> REV:20120617T110353Z
> X-CLASS:PUBLIC
> X-GNO:2
> X-GN;CHARSET=SHIFT_JIS;ENCODING=
> QUOTEDPRINTABLE:LCteam

END:VCARD
BEGIN:GROUP INFO

Collection of objects Vcards 601

FIG.6A

```
<s:Envelope
xmlns:s="http://schemas.xmlsoap.org/soap/envelope/"
s:encodingStyle="http://schemas.xmlsoap.org/soap/encoding/">
<s:Body>
<u:SetGROUP attributes xmlns:u="urn:schemas-:service:PIMS:1">
<GroupName> LCTeam</GroupName>         ← GROUP NAME 602
<GroupIcon>

ENCODING=BASE64;TYPE=JPEG:/9j/4AAQSkZJRgABAgEASABIAAD/7Q
    E0UGhvdG9zG9wIDMuMAA4QkINA+0AAAAAABAASAAAAAEAAQBIAA
    AAAQABOEJJTQPzAAAAAAAIAAAAAAAAAAA4QkINJxAAAAAAAAOoA
    AQAAAAAAAACOEJJTQP1AAAAAABIAC9mZgABAGxmZgAGAAAAA
    ABAC9mZgABAKGZmgAGAAAAAABADIAAAABAFoAAAAGAA AAAA
    ABADUAAAABAC0AAAAGAAAAAAABOEJJTQP4AAAAAABwAAD////////
    ////////////A+gAAAA///////////////////wPoAAAAP////////////////8D6A
    AAAAD////////////////A+gAADhCSU0EBgAAAAAAAgAC/+4ADkFkb2JlA
    GSAAAAAAf/bAIQADAgICAkIDAkJDBELCgsRFQ8MDA8VGBMTFRMTG
    BEMDAwMDAwRDAwMDAwMDAwMDAwMDAwMDAwMDAwMDAwMD
    AwMDAENCwsNDg0QDg4QFA4ODhQUDg4ODhQRDAwMDAwREQwMDA
    wMDBEMDAwMDAwMDAwMDAwMDAwMDAwMDAwM/8A
    AEQgBpAEsAwEiAAIRAQMRAf/EAT8AAAEFAQEBAQEBAAAAAAAAAAAA
    MAAQIEBQYHCAkKCwEAAQUBAQEBAQEAAAAAAAAAQACAwQFBg
    cICQoLEAABBAEDAgQCBQcGCAUDDDMBAAIRAwQhEjEFQVFhEyJxgTI
    GFJGhsUIjJBVSwWIzNHKC0UMHJZJT8OHxY3M1FqKygyZEk1RkRcKjdY
    X0lXiZfKzhMPTdePzRieUpWolcTU5PSltcXV5fVWZnaGlqa2xtbm9jd3h5
    ent8fX5/cRAAICAQIEBAMEBQYHBwYFNQEAAhEDITESBEFRYXEiEwUyg
    ZEUobFCI8FS0fAzJGLhcoKSQ1MVY3M08SUGFqKygwcmNcLSRJNUoxdkRV
    U2dGXi8rOEw9N14/NGlKSF
Group icon data 603

</GroupIcon>
<GroupToneVoiceCall>

ENCODING=BASE64;TYPE=MP3:/9j/4AAQSkZJRgABAgEASABIAAD
    /7QE0UGhvdG9zG9wIDMuMAA4DAwMDAwMDAwMDAwMDAw
    M/8AAEQgBpAEsAwEiAAIRAQMRAf/EATAAAAAAMAAQIEBQYHC        Group ring
    AkKCwEAAQUBAQEBAQEAAAAAAAAAQACAwQFBgcICQoLEAA          tone 604
    BBAEDAgQCBQcGCAUDDDMBAAIRAwQhEjEFQVFhEyJxgTIGFJG
    hsUIjJBVSwWIzNHKC0UMHJZJT8OHxY3M1FqKygyZEk1RkRcKjdD
    YX0lXiZfKzhMPTdePzRieUpWolcTU5PSltcXV5fVWZnaGlqa2xtbm9jd
    HV2d3h5ent8fX5/cRAAICAQIEBAMEBQYHBwYFNQEAAhEDITES
    BwYFNQEAAhEDITESBEFRYXEiEwUygZEUobFCI8FS0fAzJGLhcoK
    SQ1
    VY3M08SUGFqKygwcmNcLSRJNUoxdkRVU2dGXi8rOEw9N14/NGIKS
    F </GroupToneVoiceCall>
<GroupToneVideoCall>           ← Other group information 605
</GroupToneVideoCall>
```

FIG.6B

METHOD FOR COLLECTIVELY TRANSFERRING LOGICALLY GROUPED OBJECTS

PRIORITY

This application claims priority under 35 U.S.C. §119(a) to an Indian Patent Application filed in the Indian Patent Office on Feb. 10, 2012 and assigned Serial No. 512/CHE/2011, the entire content of which is incorporated herein by reference.

BACKGROUND

1. Field of the Invention

The present invention generally relates to data transfer in communication devices, and more particularly, to creation and transfer of groups by logically grouping objects in a communication device.

2. Description of the Related Art

Convergence of technologies has led to growth in the number of devices available for users to perform similar tasks. For example, mobile communication devices can be used for various purposes other than just making and receiving voice calls. The devices have been improving at a rapid pace in their capacity to store and process information.

Today mobile communication devices can be used as personal information organizers, as a document editor, as a camera, etc. Similarly, there are various other devices that may be used for multiple purposes. These are devices such as personal computers, laptops, tablet computers, PDAs, and the like.

Due to these advancements, the amount of information and the nature of personal information to be stored within a device have increased tremendously over the years.

Also, many devices are now being used for various purposes, sometimes multiple devices for same purposes. For example, it is common for a single person to use his personal computer, mobile phone, laptop and other Internet enabled devices for voice communication. The voice communication may happen either through a cellular network (as in the case of a mobile phone) or through Voice over IP technology (as in the case of other Internet enabled devices). Similarly, users may also be using multiple devices for similar needs like email, chat, and so on at different times.

The growth in the nature and size of information being stored and the disparity of information across devices has created a unique problem. Currently, mechanisms to deal with related information as a group of objects are limited in their functionality.

Considering the example of personal information, current mobile communication devices allow users to create user groups in their mobile devices using Personal Information Manager (PIM) features, like a contacts or a calendar application. The user can create groups for mobile device users and send data to all of them using various connectivity options like Bluetooth, LAN, and so on. The user can schedule a meeting, send agendas and share other details through the group. There are applications which allow data transfer between mobile devices in a group using a common server. In this scenario, data is stored on a server and can be updated by the connected mobile devices. Any update in data on the server is transferred automatically to the mobile devices that are connected to the server. However, data sent between the mobile device users does not get updated for all the mobile devices of the group. This may be because some of the mobile devices may not be registered with the server.

The groups created as described above primarily identify different mobile device users. These groups may allow data transfer and updating specific information related to personal information of users. For example, a user may create a group for scheduling a meeting request by using the calendar application. The calendar application makes use of contact information of selected mobile devices. This application then allows the user to add contacts; define an agenda, and set up a time using a text messaging service. Once the file is set up, the user can then send this file to a selected group from the contacts application. On receiving and accepting the request, the file gets stored under the calendar application or under messages at the received mobile device. However, many times the data transferred does not get stored properly due to compatibility issues. Also, most of the times the user needs to store each part of the data manually in different locations. Performing an update also becomes a tedious task in such a case. Further, there is no means to receive a logically created group from one mobile device to another such that the original properties of the group are retained on the receiving device. As a result, at the receiving device, the process of adding all the objects together, creating a logical Group and recreating a set of rules for the Group is a time consuming and cumbersome process.

Current applications allow users to collect objects present in a single PIM application to form a group. For example, a group can be created by selecting a group of contacts from the contact application. A scheduling application may allow users to collect Vcards, compose agenda and send a request file via an email. Files received on the mobile device get stored along with other information available on the mobile device memory. These files cannot be updated separately.

Current applications do not allow users to collect logically related objects to form groups from different PIM applications of the mobile device. Also, received information cannot be stored separately. The received information gets associated with one of the existing applications available and hence, do not allow users to define rules or properties for the grouped objects. There is no provision for transferring these groups as a separate entity to other mobile device users. Also, there is no method to store these groups separately, apply received rules or update the group accordingly.

Hence, there is a need to manage data and allow transfer of data to other devices without a loss of information. In addition, there is also a need to provide flexibility to retain the original properties of data at the receiver's end.

SUMMARY

The present invention has been made to solve the above problems and disadvantages occurring in the prior art and to provide at least the advantages described below.

Accordingly, an aspect of the present invention is to allow creation and transfer of logically grouped objects in the form of a file from one communication device to another.

Another aspect of the present invention is to store received logically grouped object files on communication devices as a separate entity and allow data updates to the files.

A further aspect of the present invention is to apply rules and properties to logically grouped objects.

In accordance with an aspect of the present invention, a method for transferring group from a communication device to a remote device in a network is provided. The method includes creating at least one group of logically related objects by extracting the logically related objects from a database of the communication device, applying rules and properties to the created groups, connecting to the remote device for transferring the groups, and transferring the group to the remote device as a single entity.

In accordance with another aspect of the present invention, a method for storing received groups on a remote device in a network is provided. The method includes receiving a group sent from a communication device as a single entity on the remote device, parsing the group for individual objects and storing the individual objects on a database, parsing rules and properties of the group for storing on the database, creating a new group if the group name exists on the remote device and applying the rules and properties to the group before storing the group as a single entity on the database.

BRIEF DESCRIPTION OF THE DRAWINGS

The above and other aspects of the embodiments of the present invention will be better appreciated and understood when considered in conjunction with the following description and the accompanying drawings, in which:

FIGS. 6A and 6B illustrate an example showing contents of a group's unique file, according to an embodiment of the present invention;

DETAILED DESCRIPTION OF EMBODIMENTS OF THE PRESENT INVENTION

Figure 1:
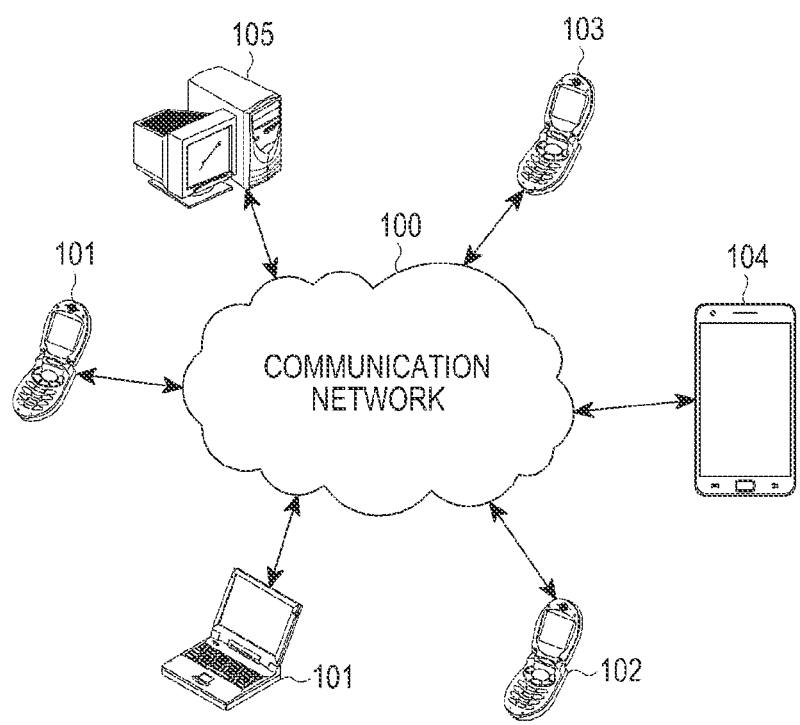
FIG. 1 illustrates an arrangement of communication devices for data transfer, according to embodiment of the present invention.

The embodiments herein and the various features and advantageous details thereof are explained more fully with reference to the non-limiting embodiments that are illustrated in the accompanying drawings and detailed in the following description. Descriptions of well-known components and techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiment. In the drawings, similar reference characters denote corresponding features consistently throughout the figures.

FIG. 1 illustrates an arrangement of communication devices for data transfer, according to an embodiment of the present invention. The communication device as referred to herein may be any computing device, mobile device and the like where data may be grouped together based on user, group, nature of information, etc. Various types of communication devices can communicate with each other using a communication network 100. The communication devices may be in vicinity or may be located remotely and referred to as remote devices. The communication devices may include mobile phones (101,102,103), a smart phone 104, a personal computer 105, and a notebook 106. The communication devices can transfer data using short range communication like Bluetooth or Infrared. The communication devices can also communicate data via instant messaging services, SMS, email and so on. The mobile phones (102,103,104) may contain multiple vObjects (e.g. contacts, calendar, schedule, tasks etc. but not limited to). The applications that manage objects generally manage personal information of users and manage objects like Phone book, Calendar, Appointments, Scheduler, Tasks/Memo, Holidays etc. There are other applications to manage media objects. Also, applications exist to customize media settings.

In some embodiments, all the information related to one stored objects can be grouped together. For example, a single person's contact group may comprise the contact name, number, email, calls made by the number, calls made to the number and so on. A 'Group' mentioned in this document can be defined as collection of objects which are logically related to each other and are bound together with a set of rules and actions which could be user defined. Further, the objects of the group can be bound together with set of properties. A group is created by the user of a communication device. The group can be assigned a unique name or ID. In an embodiment of the present invention, the group name or ID can be derived by utilizing at least one of Bluetooth ID, MAC ID and the like, of the user device.

Further, the user sets the properties for each of the objects in the group, or the user sets the property for the group as an entity. Furthermore, the user sets the rules for each of the objects in the group, or the user sets the rules for the group as an entity. After creating a group and setting properties and rules, the user transfers the group to counterpart devices. For example, the mobile phone 101 may create a group "Office" in which the user can include various objects such as the name of his colleagues, contact numbers, email IDs, photos, videos, a project name on which his colleagues are working, colleagues' schedules and the like. Further, the user can set properties for each object, in which the user defines the number of pixels or the size of the photos, length of the video, geo-tagging of the photos and the like. Furthermore, the user can also set rules for the group, in which the user applies rules of arranging the names in alphabetical order, prioritizing tasks whose deadlines are near, and so on. After defining properties and rules for the group, the user can transfer the created group to counterpart devices, like the smart phone 104 or the note book 106. The creation of groups allows users to store data in the same way in multiple devices, as the counterpart devices cannot change the rules or properties of the group as an entity. Also, groups may encourage users to combine different objects from stored data, create and transfer groups and store the received groups as separate entities.

Figure 2A:
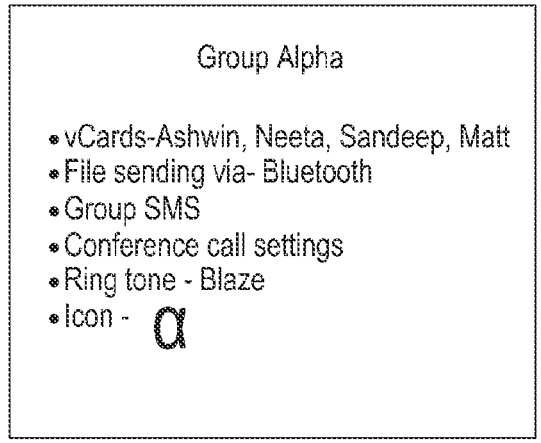
FIGS. 2A and 2B illustrate examples of groups which can be formed by collecting logically related objects, according to an embodiment of the present invention.
Figure 2B:
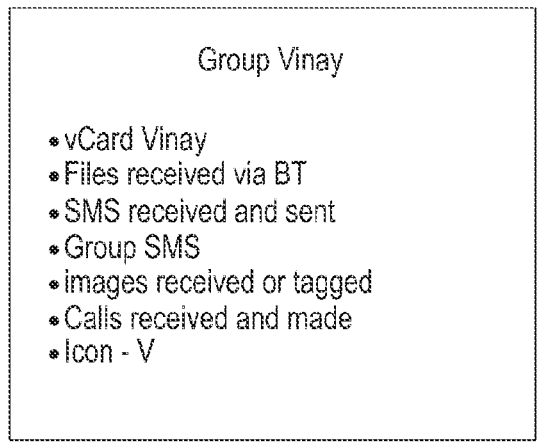

FIGS. 2A and 2B illustrate examples of groups which can be formed by collecting logically related objects. In an embodiment of the present invention, every object in the group will have some logical relation with other objects in group. As an example, the Vcards of members of a media team, photos taken at a particular location, and so on, are in the group. FIG. 2A shows a group called Alpha. This group has been formed by members of a project team. Each name of the member contains the vCard giving access to all the information of that member. Various properties are assigned to the group like a common ring tone, an icon, and so on. Further, rules are defined for the group. In this example, file sending may be allowed only via Bluetooth. Conference settings may also be configured. This example shows all the different objects a group may contain, such as vCard, ring tone, icon, conference settings, file transfer rules and the like. The group can be created by one user and sent to all the members of the project team. Each member will have the group information, properties and rules stored in their communication device.

FIG. 2B illustrates a group created to access all the information related to one stored contact. This shows a group called Vinay which includes the vCard of contact Vinay. The other group objects include files received from Vinay via Bluetooth, all the SMS received and sent, all the calls made to Vinay and received from Vinay, all the meeting scheduled with Vinay, images received from Vinay and images in which Vinay has been tagged, and an Icon V. Rules are set for acquiring the entire object related information and updated regularly. Also, the Icon V is displayed on the user screen and the user gets information on all the activities happening with Vinay via the device.

The types of groups which can be formed are unlimited and based on user needs and available objects in the database of the communication device. Further, while creating a group, the user can add specific characteristics to the group and add metadata for this group. On the other hand, actions can be done together by the group, like share the group, send it to other devices, backup the group, publish the group, and so on.

Figure 3:
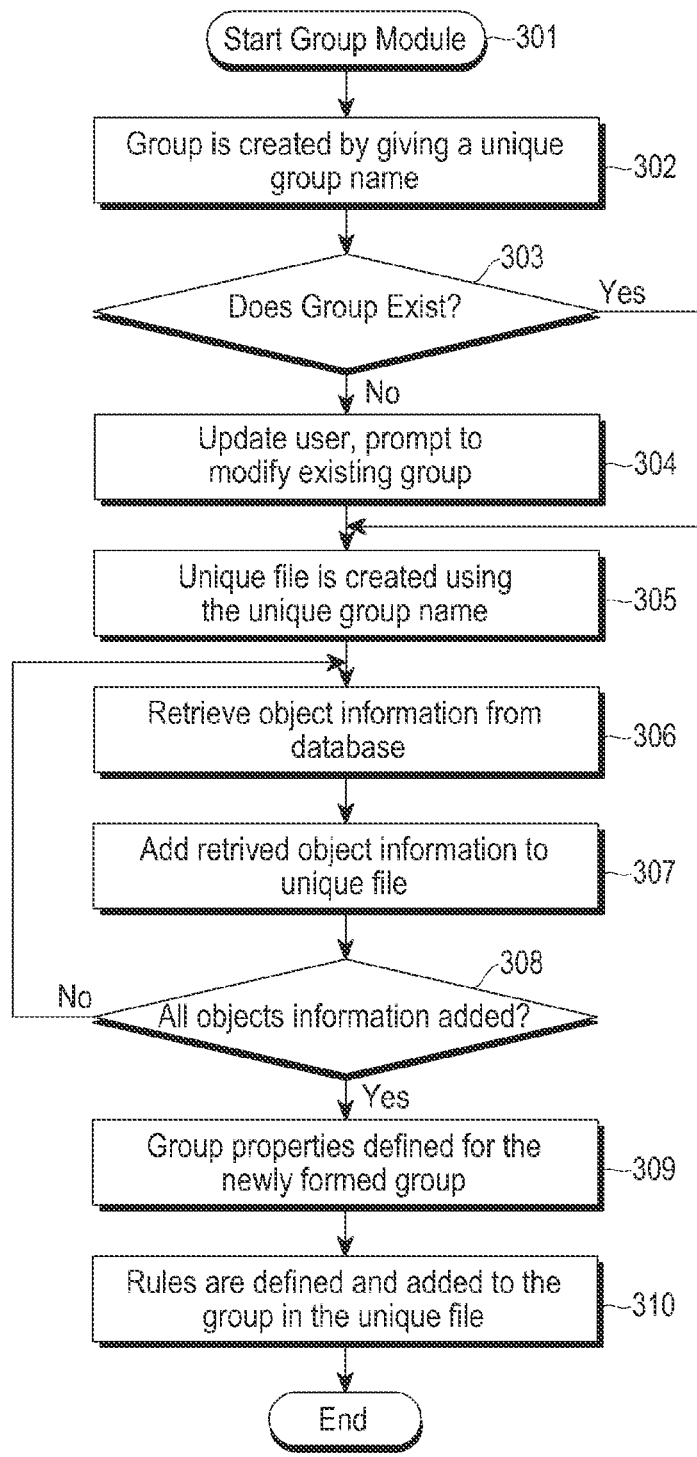
FIG. 3 illustrates a method of creating a group by adding objects from the communication device memory, according to an embodiment of the present invention.

FIG. 3 describes a method of creating a group by adding objects from the communication device memory, according to an embodiment of the present invention. The method begins with creating a group module at step 301, and assigning a unique group name at step 302. The group name can be derived by utilizing at least one of Bluetooth ID, MAC ID, and the like of the user device. The device memory database is then checked to determine if such a group name already exists at step 303. If the same group name is found in the memory, the user is sent a message at step 304 prompting the user to modify the existing group or create a new group. If the group does not exist, a unique file is created at step 305 using the unique group name (or using the modified or created group name). This will help counterpart remote devices to understand that the incoming file contains group information along with individual objects, rules and properties of the Group. Based on the object selected by the user, object information is retrieved at step 306 from the device database. The retrieved object information is then added to the unique file at step 307. It is then checked if all the objects required are added at step 308, and if so, the properties of the group are defined at step 309 and stored in the unique file. Also, rules are defined for the group and added to the file in step 310. All the objects and its related metadata described above are arranged in an XML format in the unique file. This addresses parsing and interoperability issues during the transfer to the remote devices. The various actions in the above method may be performed in the order presented, in a different order or simultaneously. Further, in some embodiments, some actions listed in FIG. 3 may be omitted.

Figure 4:
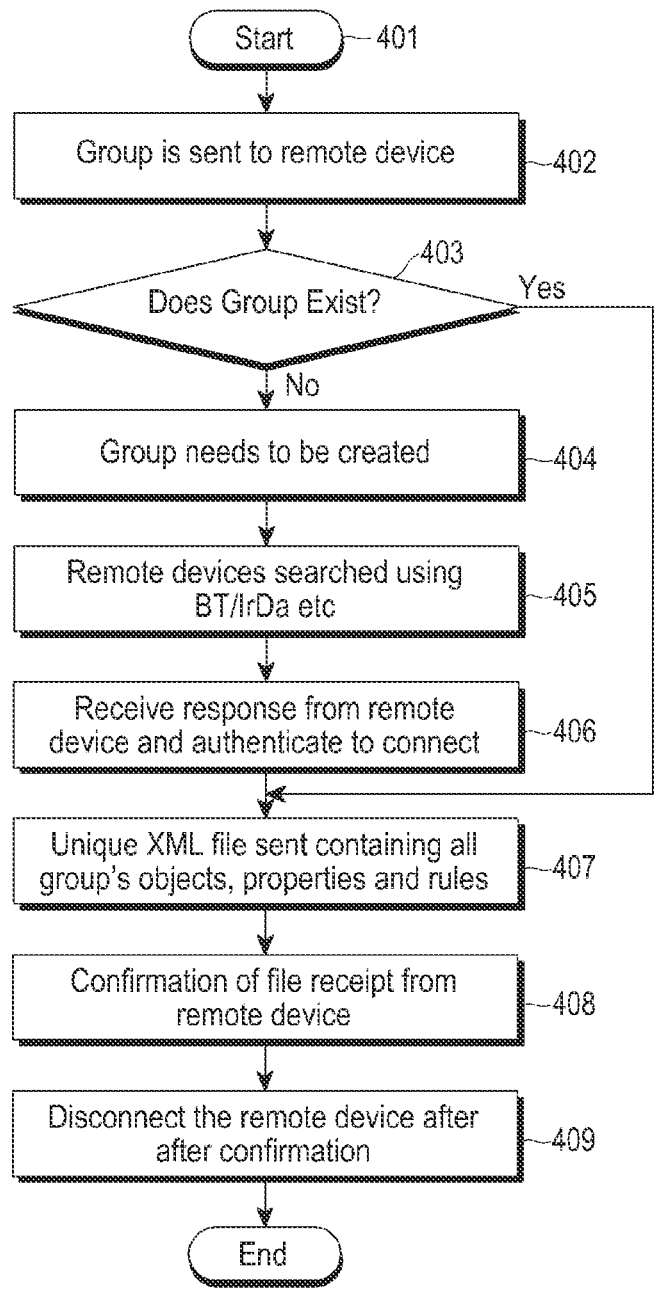
FIG. 4 illustrates a method of sending a group from one communication device to a counterpart remote device, according to an embodiment of the present invention.

FIG. 4 describes a method of sending a group from one communication device to a counterpart remote device, according to an embodiment of the present invention. While FIG. 4 considers the example of a mobile device, the same is applicable to any communication device. The method begins at step 401 with a mobile device sending the group to other remote devices at step 402. If the group exists, the method goes to step 407, as described below. The mobile device then checks if such a group file exists in the database at step 403. If the group exists, the method proceeds to step 407, as described below. If the group does not exist, the user is prompted that the group needs to be created at step 404. Then the mobile device starts searching at step 405 for remote devices using Bluetooth and IrDA. Once a counterpart remote device is found, the mobile device receives a response from the counterpart remote device at step 406, and then authenticates the response and establishes a connection with the counterpart remote device. The unique file (i.e., a unique xml file containing all groups' objects, properties and rules) containing the group is then sent to the counterpart remote device at step 407. The file contains all group objects, properties and rules. The mobile device then waits to receive a confirmation at step 408 from the counterpart remote device before disconnecting the remote device at step 409. After confirmation, the counterpart remote device is disconnected. The various actions in the above method may be performed in the order presented, in a different order or simultaneously. Further, in some embodiments, some actions listed in FIG. 4 may be omitted.

Figure 5A:
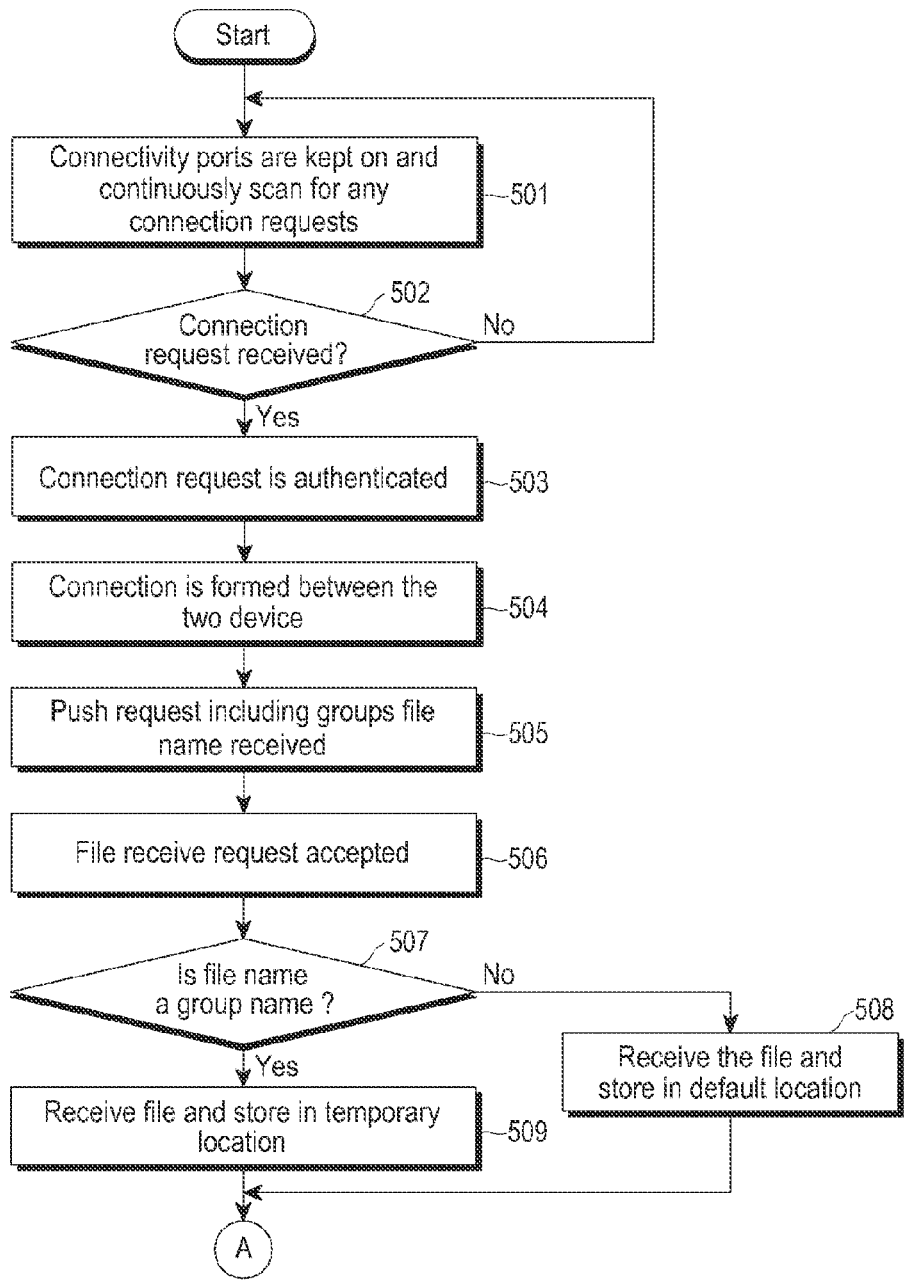
FIGS. 5A to 5C illustrate a method of receiving, parsing and storing a group at the remote counterpart device end, according to an embodiment of the present invention.
Figure 5B:
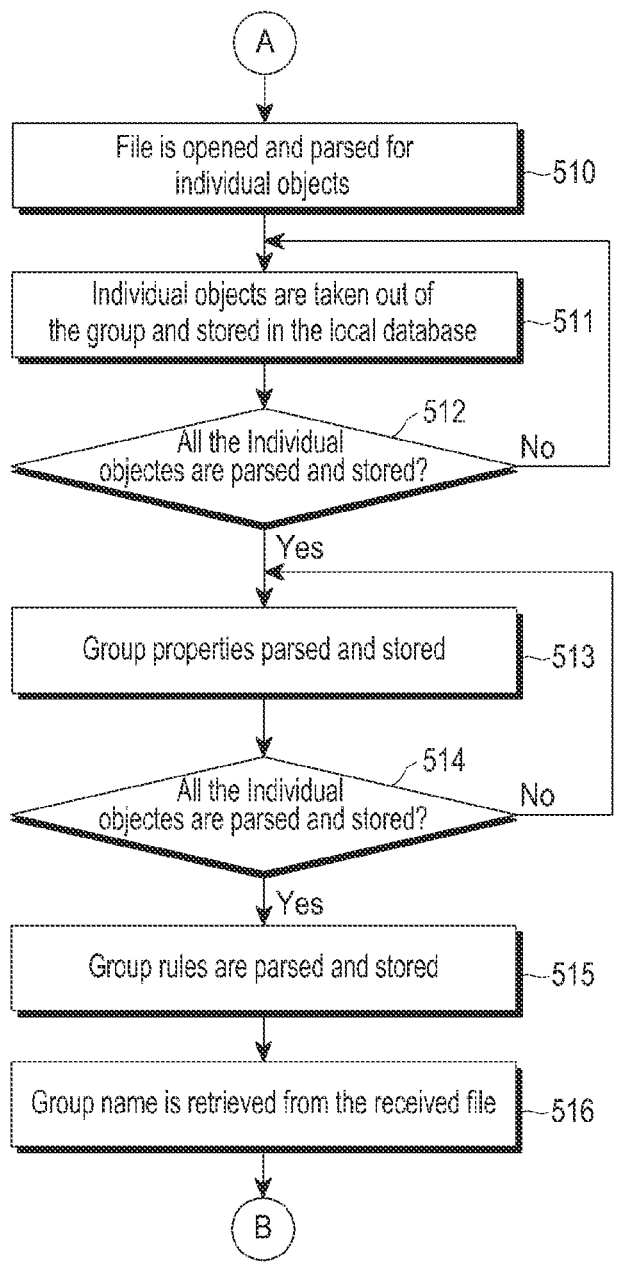
Figure 5C:
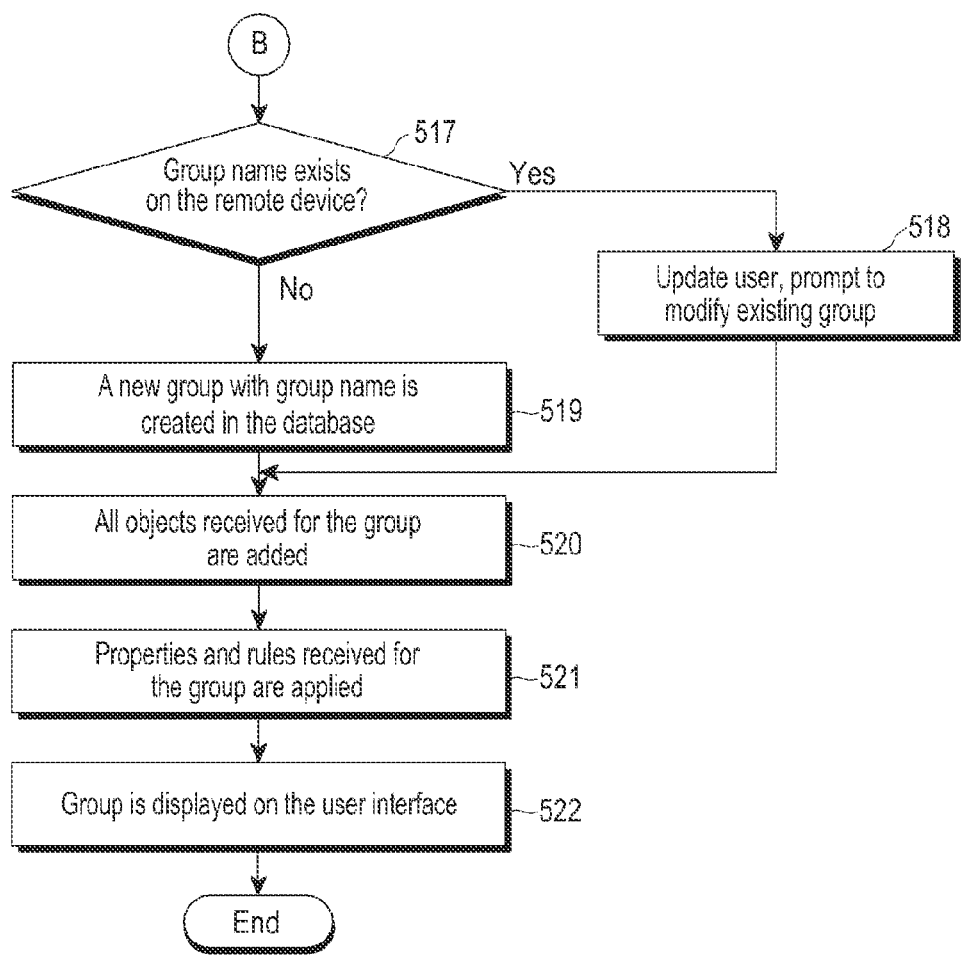

FIGS. 5A to 5C describe a method of receiving, parsing and storing a group at the counterpart remote device end, according to an embodiment of the present invention. In FIG. 5A, the counterpart remote devices keep their connectivity ports on and continuously scan for any connection requests at step 501. At step 502, it is checked if a connection request is received. If a connection request is not received, the method returns to step 501. When a connection request is received at step 502, authentication is confirmed by the user to connect with the counterpart remote device at step 503. Once the connection is formed at step 504, the push request including the file name is received at step 505. The file receive request is accepted at step 506 and the counterpart remote device checks if the file name received has a group name at step 507. If the file name is not a name of a group, the file is received and stored in the default location at step 508. If file name is that of a group, the file is received and stored in a temporary location first at step 509.

Referring to FIG. 5B, the file is opened and parsed at step 510. The individual objects are then taken out of the group and stored individually in the local database at step 511. In an embodiment of the present invention, if there are any duplicates in the objects then they may be resolved by employing common conflict resolution policies. Once all the individual objects are parsed and stored, the group properties present in the received file are then parsed and stored in steps 512 to 513. Once all the group properties are parsed and stored in step 514, any rules that apply to the group are parsed and stored in the local database in step 515. Finally, the group name is retrieved at step 516 from the received file.

Referring to FIG. 5C, before storing the entire group as an entity on the database of the counterpart mobile device, the device checks if the group name exists at step 517. If a group name is present, the remote device user is prompted to update (or modify) the existing group at step 518. If group name is not present, a new group with the retrieved group name is created at step 519 in the database of the counterpart remote device. Next, all the objects received along with this group are added to it at step 520 and the properties and rules are applied to the group as well at step 521. Finally the group is displayed on the user interface at step 522.

In one embodiment, after the file is fully received, parsing can be started. In another embodiment, as soon as the first buffer of the file is received from the other device, parsing can be started. After successful creation of the new Group, the received file can either be deleted or kept as a backup. The various actions in the above method may be performed in the order presented, in a different order or simultaneously. Further, in some embodiments, some actions listed in FIGS. 5A to 5C may be omitted.

In an embodiment, once the group file is received by the remote device, the individual objects can be taken out from the group file. Group properties and rules can be parsed and stored on the remote device. The remote device user can update the existing group or can create a new group. Further, all the objects received for the group can be added. Properties and rules received for the group can be edited by the remote device user.

FIGS. 6A and 6B illustrate examples of contents of a group's unique file, according to an embodiment of the present invention. All the Objects (vCards 601 in this case as shown in FIG. 6A) are stored sequentially followed by the Group name 602, Group's properties and user defined rules if any, as shown in FIG. 6B. Group properties in this figure show group icon data 603, and group ring tone 604. Other group information 605 like tone for video call may also be set. The file format could be XML with user defined tags. The information displayed in FIGS. 6A and 6B is only for explanatory purposes and additions/deletions in objects and metadata is contemplated.

Figure 7:
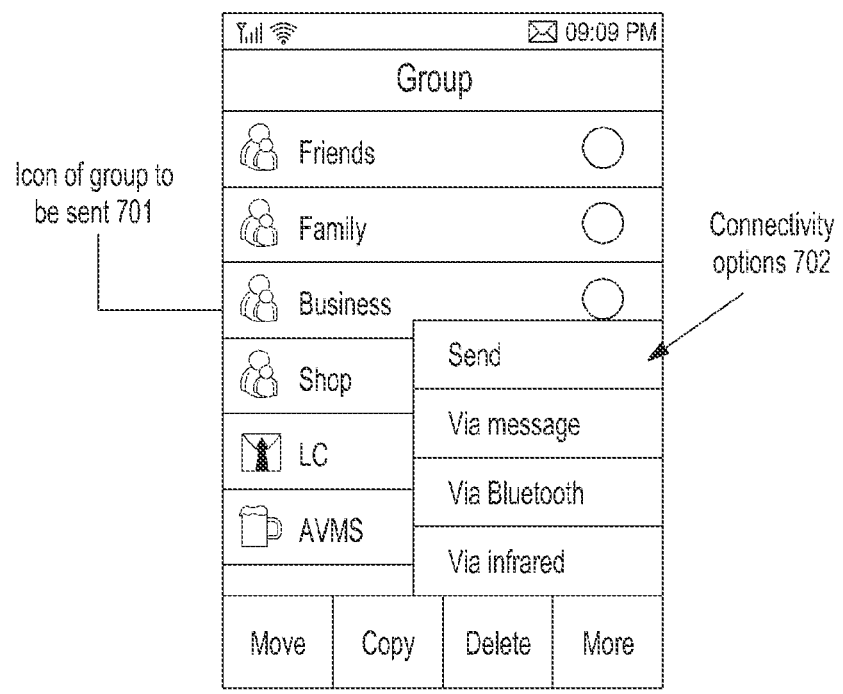
FIG. 7 illustrates the communication device user interface displaying the newly created group icon and the sending options available, according to an embodiment of the present invention.

FIG. 7 illustrates the communication device user interface displaying the newly created group icon and the available sending options, according to an embodiment of the present invention. The icon of the group to be sent 701 is shown, and the short range connectivity options 702 show SMS, Bluetooth and infrared. Although only short range connectivity options are shown, Groups can also be sent by other communication means.

Figure 8:
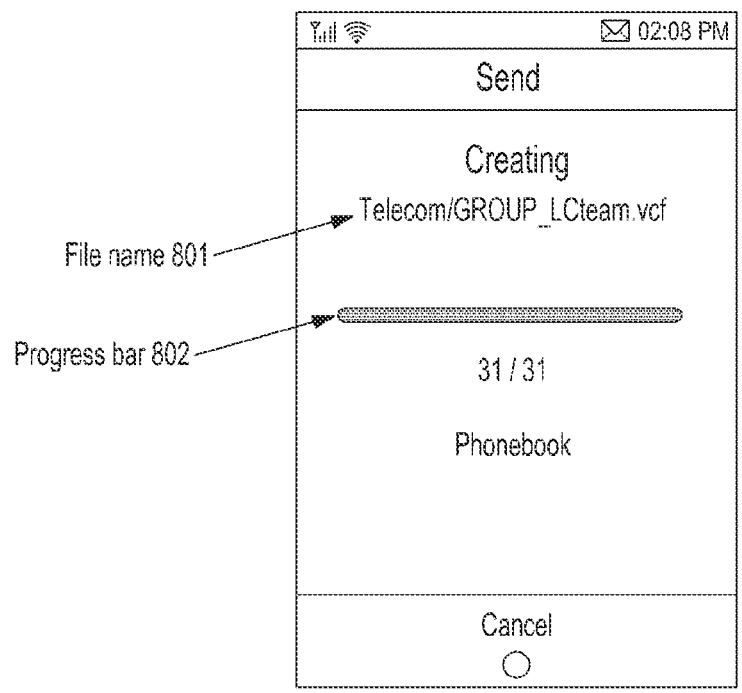
FIG. 8 illustrates the communication device user interface displaying the creation of newly created group, according to an embodiment of the present invention.

FIG. 8 illustrates the communication device user interface displaying the creation of a newly created group, according to an embodiment of the present invention. A progress bar 802 is displayed and updated during adding objects and metadata from the database to the unique file. The unique file's name 801 is also shown to the user. A user can abort this unique file creation process at any time.

Figure 9:
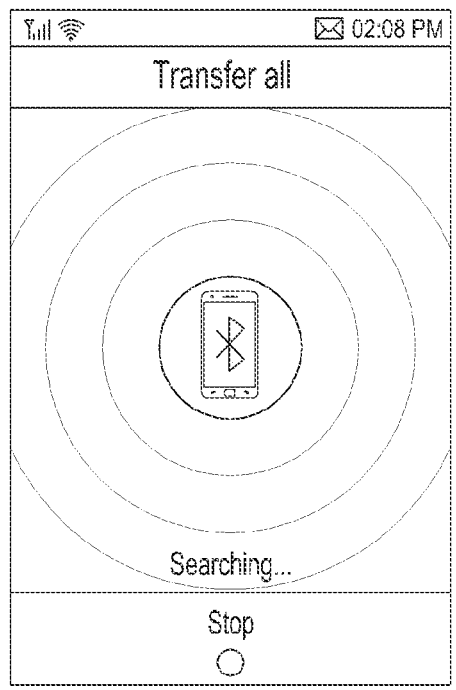
FIG. 9 illustrates the communication device user interface searching for counterpart remote devices in the vicinity, according to an embodiment of the present invention.

FIG. 9 illustrates the communication device user interface searching for counterpart remote devices in its vicinity, according to an embodiment of the present invention. Though Bluetooth technology is described here, any other wired or wireless method can be used.

Figure 10:
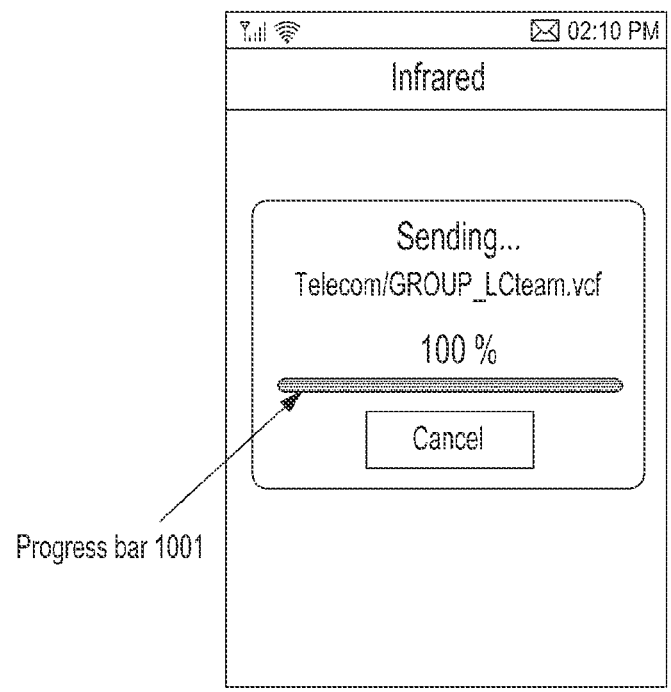
FIG. 10 illustrates the communication device user interface sending the group to a remote device via an infrared connection, according to an embodiment of the present invention.

FIG. 10 illustrates the communication device user interface sending the group to a remote device via an infrared connection, according to an embodiment of the present invention. A progress bar 1001 shows the user the percentage of file transferred to the counterpart device.

Figure 11:
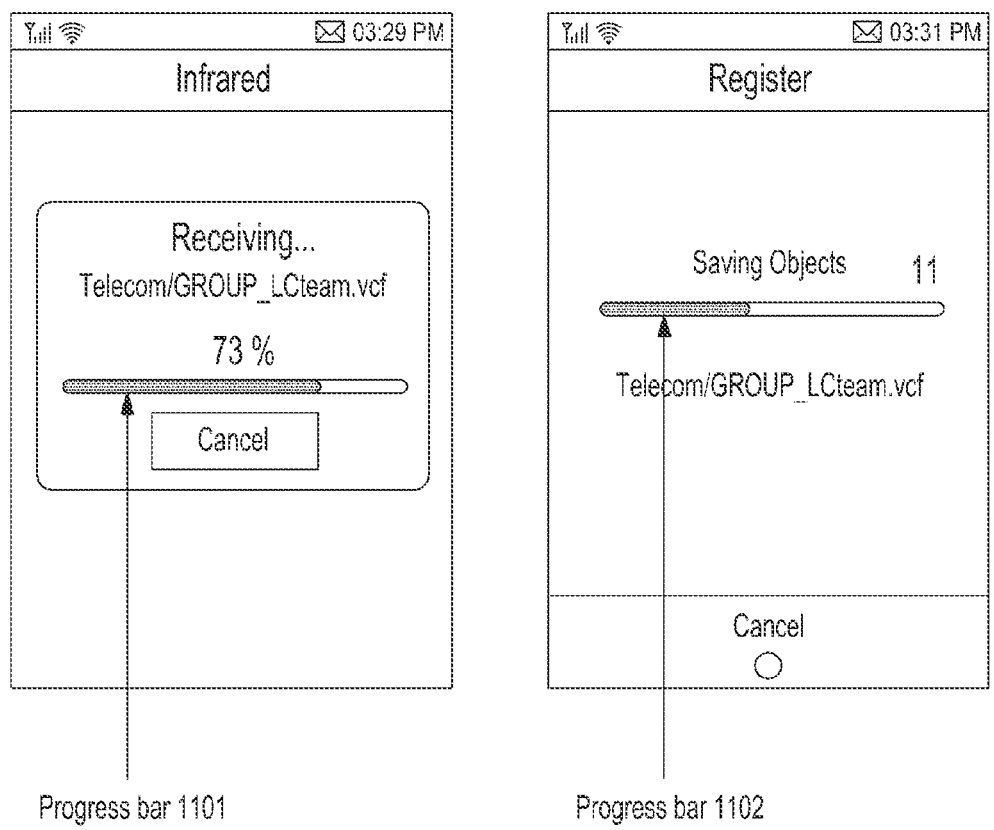
FIG. 11 illustrates the counterpart remote device user interface receiving the group file and registering group's data on the counterpart remote device, according to an embodiment of the present invention.

FIG. 11 illustrates the counterpart remote device user interface receiving the group file and registering group's data on the counterpart remote device, according to an embodiment of the present invention. A progress bar 1101 updates the user about the status of file transfer. Once the file is received, progress bar 1102 for parsing the objects from the file and registering the same to the database is shown. In one embodiment, the group file is received first and then the objects of the group are registered. In another embodiment, the processes of receiving the file and registering the objects can be carried out simultaneously.

Figure 12:
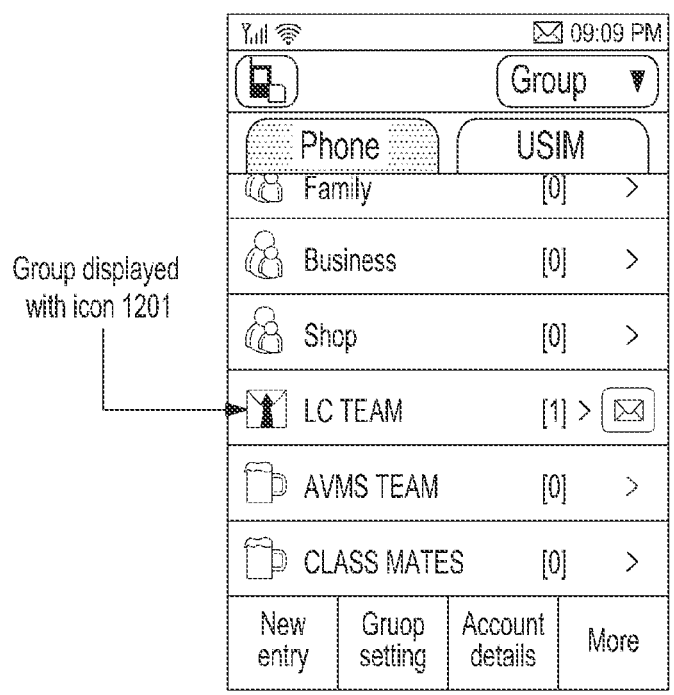
FIG. 12 illustrates the counterpart remote device user interface displaying the received group file icon, according to an embodiment of the present invention.

FIG. 12 illustrates the counterpart remote device user interface displaying the received group file icon, according to an embodiment of the present invention. Once the Group is received and registered on the counterpart remote device, the newly created Group or existing Group which is updated can displayed as an icon 1201 on the user's device.

Figure 13:
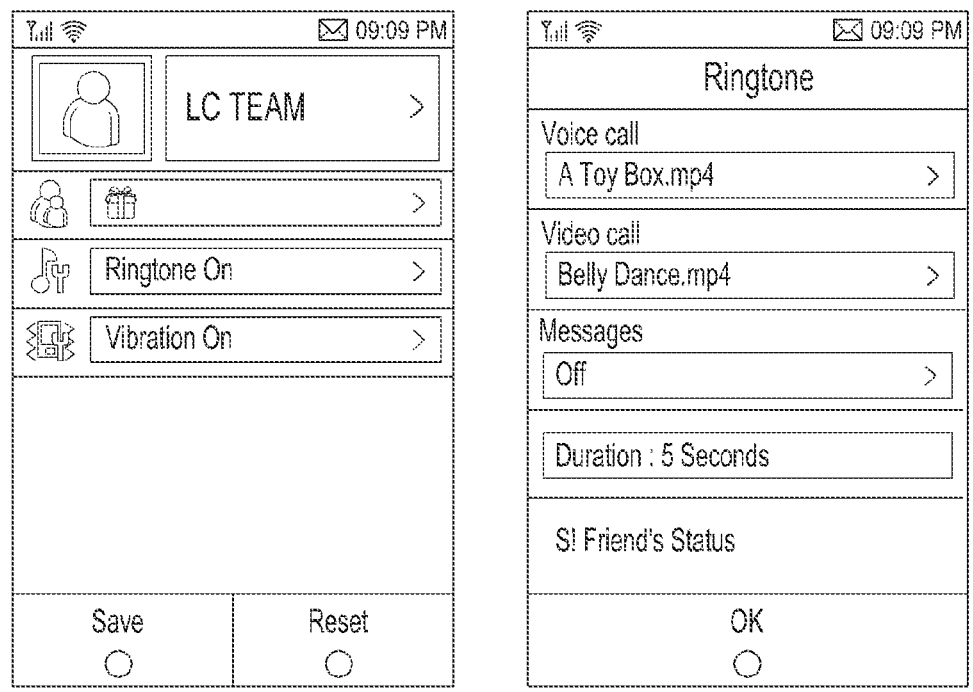
FIG. 13 illustrates the counterpart remote device user interface displaying the received group objects, properties and rules, according to an embodiment of the present invention.

FIG. 13 illustrates the counterpart remote device user interface displaying the received group objects, properties and rules, according to an embodiment of the present invention. An application's perspective of when the Group along with its properties and rules is received and registered on the counterpart device is shown along with all the original settings, rules and properties associated with the Group. In all the cases, behavior of Grouped objects will remain the same across various devices and are treated as a single entity. The transferred Group retains all its characteristics on the received device. The user need not manually create a Group again with the transferred objects and apply a set of rules to it. The present invention can also be used to back up large Groups where there is a shortage of storage space, and is applicable to any type of object which can be grouped.

The foregoing description of the embodiments of the present invention so fully reveals the general nature of the embodiments herein that others can, by applying current knowledge, readily modify and/or adapt the specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein can be practiced with modification within the spirit and scope of the embodiments as described herein.

The invention claimed is:

1. A method for transferring an information related to a group of objects from a communication device to a remote device in a network, the method comprising:

creating at least one new group comprising a plurality of objects related to each other by extracting the plurality of objects from a database of the communication device; wherein creating the at least one new group further comprises:

selecting the objects related to each other from the database of the communication device;

forming a group based on the selected objects on the communication device;

creating a file with a unique name for the group on the communication device; and assigning the rules and properties to the group on the communication device;

applying rules and properties to the created new group locally on the communication device;

connecting to the remote device for transferring the group; and transferring an information related to the created new group to the remote device as an unique file containing objects, properties and rules of the created new group to create the new group based on the transferred information related to the created new group in the remote device,
wherein the group is a set of objects which are logically related to each other and are bound together with a set of rules and actions and
wherein the selected objects can be modified individually.

2. The method of claim 1, wherein the group is uniquely named by utilizing at least one of a Bluetooth ID or a MAC ID of the communication device.

3. The method of claim 1, wherein the rules may be employed by a user to perform a single operation on the entire group.

4. The method of claim 1, wherein the plurality of objects and its related metadata are arranged in an XML format in the unique file.

5. The method of claim 1, further comprising merging the rules and properties of the group into a unique object data to optimally manage the data.

6. The method of claim 1, wherein the communication device is at least one of a mobile phone, a smart phone, a notebook, and a personal computer.

7. The method of claim 1, wherein the remote device is at least one of a mobile phone, a smart phone, and a notebook, a personal computer.

8. A method for processing an information related to a group of objects on a remote device in a network, the method comprising:
receiving an information related to a group sent from a communication device as an unique file containing objects, properties and rules of the new group; parsing the group for individual objects and storing the individual objects on a database;
checking whether an information corresponding to a name of the group exists on the database;
when the information corresponding to the name of the group is not present on the database, creating a new group having the name of the group on the remote device;
applying the rules and properties to the created new group through parsing the rules and properties of the group and storing the group as a single entity on the database; and
displaying at least one information related to the created new group on a screen of the remote device,
wherein the group is a set of objects which are logically related to each other and are bound together with a set of rules and actions.

9. The method of claim 8, wherein the plurality of objects and its related metadata are arranged in an XML format in the unique file.

10. The method of claim 8, wherein the received group is parsed after a group file is completely received.

11. The method of claim 8, wherein the received group is parsed after a first buffer of a group file is received.

12. The method of claim 8, wherein the communication device is at least one of a mobile phone, a smart phone, a notebook, and a personal computer.

13. The method of claim 8, wherein the remote device is at least one of a mobile phone, a smart phone, a notebook, and a personal computer.

14. The method of claim 8, further comprising
applying new rules and properties to the new group before storing the group as the single entity on the database.

15. The method of claim 8, wherein the group is uniquely named by utilizing at least one of a Bluetooth ID or a MAC ID of the communication device.

* * * * *